United States Patent [19]

Rousseau

[11] Patent Number: 5,352,494

[45] Date of Patent: Oct. 4, 1994

[54] PROCESS FOR THE PRODUCTION OF A COMPOSITE MATERIAL PROTECTED AGAINST OXIDATION AND MATERIAL OBTAINED BY THIS PROCESS

[75] Inventor: Gérard Rousseau, Saint Aubain de Medoc, France

[73] Assignee: Societe Nationale Industrielle et Aerospatiale, France

[21] Appl. No.: 911,335

[22] Filed: Jul. 8, 1992

Related U.S. Application Data

[63] Continuation of Ser. No. 605,656, Oct. 30, 1990, abandoned.

[30] Foreign Application Priority Data

Nov. 9, 1989 [FR] France .................. 89 14703

[51] Int. Cl.⁵ .............. B05D 3/06; B05D 1/36; C23C 16/00
[52] U.S. Cl. .................. 427/562; 427/569; 427/577; 427/255.2; 427/255.3; 427/419.2; 427/419.7
[58] Field of Search ............... 427/573, 569, 567, 570, 427/571, 572, 574, 575, 577, 564, 566, 562, 255.1, 255.2, 255.3, 402, 419.1, 419.2, 419.7, 585, 586, 587, 590, 584, 582, 581, 530, 529, 527

[56] References Cited

U.S. PATENT DOCUMENTS

| | | |
|---|---|---|
| 4,425,407 | 1/1984 | Galasso et al. .......... 427/249 |
| 4,472,476 | 9/1984 | Veltri et al. . |
| 4,476,164 | 10/1984 | Veltri et al. . |
| 4,576,836 | 3/1986 | Colmet et al. . |
| 4,613,522 | 9/1986 | Vasilos . |
| 4,766,013 | 8/1988 | Warren . |
| 4,894,286 | 1/1990 | Gray ...................... 427/402 |
| 5,093,156 | 3/1992 | Uemura et al. ........... 427/419.7 |

FOREIGN PATENT DOCUMENTS

| | | |
|---|---|---|
| 0133315 | 2/1985 | European Pat. Off. . |
| 0200568 | 11/1986 | European Pat. Off. . |
| 0282386 | 9/1988 | European Pat. Off. . |
| 0310043 | 4/1989 | European Pat. Off. . |
| 1814579 | 12/1967 | Fed. Rep. of Germany . |
| 1594347 | 7/1970 | France . |
| 2611198 | 2/1981 | France . |
| 2635773 | 8/1988 | France . |

OTHER PUBLICATIONS

Chemical Abstracts of Japan, No. 26, (Hashimoto Noboru) Feb. 26, 1988, JP-A-86-95,043 Apr. 24, 1986.

Primary Examiner—Marianne Padgett
Attorney, Agent, or Firm—Pearne, Gordon, McCoy & Granger

[57] ABSTRACT

Process for the production of a composite material protected against oxidation and the material obtained by the process. The invention relates to a process for the production of a material incorporating a composite body on which an aluminum nitride layer is directly deposited and then a tight layer of a refractory oxide in order to ensure its protection against environmental oxidation. The aluminum nitride layer is attached to the composite by an aluminum carbide layer. The oxide layer is an alumina layer.

9 Claims, 2 Drawing Sheets

PROCESS FOR THE PRODUCTION OF A COMPOSITE MATERIAL PROTECTED AGAINST OXIDATION AND MATERIAL OBTAINED BY THIS PROCESS

This is a continuation of application Ser. No. 07/605,656, filed Oct. 10, 1990 now abandon.

BACKGROUND OF THE INVENTION AND RELATED ART

The present invention relates to a process for the production of a composite material made unoxidizable at high temperature (up to 1800° C. under a low air pressure), as well as to the material obtained by this process.

This material is more particularly intended for use as a high performance heat protection for space vehicles (shuttles or aircraft) having to withstand the heating caused by the friction of the air when they reenter the earth's atmosphere at high speed.

However, the invention is also applicable to other industrial fields requiring the use of structures able to withstand high mechanical stresses under temperatures above 1100° C. in a corrosive medium.

The oxidation-protected materials to which the invention applies are composite materials, particularly of the carbon-carbon (C/C) type appropriately constituted by carbon fibers embedded in a carbon-based matrix.

One of the essential advantages of carbon-carbon materials is that they retain their integrity up to 3000° C. or higher, under rapid heating. However, their major disadvantage is that they significantly oxidize as from 400° C. in the presence of air.

Different processes have been envisaged to prevent this oxidation, such as the protection of the composite materials based on the use of a silicon carbide (SiC) coating formed on the outer surface of the carbon-containing parts. The use of this outer SiC coating is in particular described in FR-A-2 611 198 filed in the name of the present Applicant and documents EP-A-0 133 315, U.S. Pat. Nos. 3,095,316, 3,406,044, and 3,925,577.

The different deposition methods for a SiC layer on C/C composite materials always lead to the obtaining of a cracked layer as a result of the expansion coefficient variation between carbon and silicon carbide. To obviate this disadvantage, with the outer SiC coating is associated a silica or borosilicate glass coating for sealing the cracks of the SiC coating.

This sealing functions correctly up to approximately 1700° C. under atmospheric pressure. However, under reduced pressure, the operating temperature of these materials is limited by the reaction of $SiO_2$ on SiC corresponding to the equation $SiC + SiO_2 \rightarrow 2SiO + CO$.

In order to ensure a sealing of the cracks of the SiC coating by a material able to withstand high temperatures under reduced pressures, the Applicant has envisaged depositing on the silicon carbide layer an outer oxide layer chosen from among $ThO_2$, $ZrO_2$, $HfO_2$, $La_2O_3$, $Y_2O_3$ and $Al_2O_3$ and an intermediate layer serving as a reaction barrier between the SiC and the oxide, said intermediate layer being chosen from in particular aluminum nitride and hafnium nitride. This arrangement is described in FR-A-2 635 773 filed on 31.8.1988 by the present Applicant.

The oxidation protection described in said document is completely satisfactory. However, for certain applications said protection is too complex. Moreover, it leads to a relatively heavy material. In addition, it would be of interest to have a more easily obtained, lighter material, in particular making it possible to eliminate the outer silicon carbide coating.

SUMMARY OF THE INVENTION

The invention therefore relates to a process for producing an oxidation-protected composite material having no silicon carbide coating, as well as to the materials obtained by this process.

The invention therefore relates to a process for the production of a material having a composite body which, by an outer coating, is protected against oxidation due to the environment, said body having a substrate of inorganic fibers embedded in a carbon-based matrix, characterized in that it consists of directly depositing on said body an aluminum nitride layer and then on said aluminum nitride layer an outer tight layer of refractory oxide in order to form said outer covering.

The outer covering protects the composite material on which it is deposited against the external environment, which is in particular an oxidizing atmosphere such as air.

To this end, it is desirable for the AlN layer to be as tight as possible and is in crystalline form. The essential function of the AlN layer is as a reaction barrier between the refractory oxide and the carbon of the composite body.

The aluminum nitride (AlN) layer can be deposited by different methods of varying efficiency giving layers which are cracked to a greater or lesser extent as a function of the deposition temperatures used. This phenomenon of the cracking of outer coverings is due to differences in the expansion coefficient between the materials involved. In particular, AlN has an expansion coefficient of 4.5 to $5 \times 10^{-6}/°C$., carbon an expansion coefficient of 1 to $2.5 \times 10^{-6}/°C$. and graphite an expansion coefficient of 3 to $6 \times 10^{-6}/°C$.

The AlN covering is produced at a temperature Tf which is always above the ambient temperature Ta. After cooling, said covering is tensile stressed $\sigma_t = K(Tf - Ta)$, in which K is a constant, $\sigma_t$ decreases in direct proportion with decreasing temperature Tf. The smaller Tf−Ta and the closer together the expansion coefficients the less numerous the cracks. The width of the cracks is directly proportional to (Tf−Ta) and to the difference in the expansion coefficients.

When the material is heated to a temperature above Tf, in particular corresponding to a temperature Tu at which the material is to be used the cracks progressively close up to a temperature of Tf where they are eliminated and the material is then compressed. The compression strain increases in accordance with the law $\sigma_c = k(Tu - Tf)$, in which k is a constant.

Thus, in order to improve the effectiveness of the AlN material at the temperature where carbon starts to oxidize (400° C. approximately) it is necessary to lower Tf. This is possible when temperature at which the material is to be used does not cause fracturing of the compressed layer.

In addition, the deposition methods used for the AlN layer are those for which the temperature Tf can be chosen. Thus, it is possible to produce the Aln covering with the minimum temperature Tf compatible with the temperature at whcih the material is to be used. These methods are essentially chemical vapour phase deposition (CVD) and plasma assisted chemical vapour phase deposition (PECVD).

The temperature ranges of these two methods are complimentary. Thus, PECVD is used between ambient temperature and 800° C. and CVD between 600° and 1400° C. One or other of these methods can be chosen, as a function of the particular envisaged use of the material.

PECVD AlN deposition is carried out with a precursor aluminum chloride ($AlCl_3$) and ammonia ($NH_3$) mixture and also optionally nitrogen, whereas CVD deposition is carried out with a mixture of $AlCl_3$ and $NH_3$, to which hydrogen may be added.

Although preference is given to chemical vapour phase deposition methods, it is possible to utilize the nitriding of an aluminum deposit or reactive physical vapour phase deposition (PVD), such as reactive cathodic sputtering and reactive evaporation.

Nitriding firstly consists of depositing an aluminum layer by cathodic sputtering or evaporation on the composite body and then placing the entity in a nitriding furnace, where progressive heating takes place under a nitrogen atmosphere. Nitriding starts at about 600° C. and the material is progressively heated to 1200° C., which is the temperature where the complete consolidation of the nitride layer takes place. The AlN layers obtained have a thickness of 1 to 5 micrometers.

Reactive PVD methods give rise to low temperature (20° to 600° C.), very thin (approximately 1 to 5 micrometer) layers. Therefore these methods can only be used for materials to be employed at low temperatures, so as to limit the formation of cracks by compression during their use.

At a relatively high temperature (above 1000° C.) the oxygen in the air in contact with the AlN layer oxidizes its surface, which leads to the natural formation of $Al_2O_3$ in accordance with the reaction:

$$2 AlN + 3/2 O_2 \rightarrow Al_2O_3$$

This surface alumina is slightly porous and then slows down the penetration of the oxygen into the AlN layer. This natural layer of $Al_2O_3$ favors the protection against oxidation of the composite material, in view of the fact that alumina is a material able to withstand heat and oxidation.

Moreover, during the deposition of AlN at a temperature above 600° C., the aluminum nitride reacts with the carbon in the composite material in order to form an interface aluminum carbide ($Al_4C_3$) layer, which assists the attachment of AlN to the material, thus ensuring a good adhesion of said AlN layer to the carbon.

In the case of a low temperature AlN deposition of at the most 600° C., the material is heated at between 600° and 1000° C., in order to ensure the formation of said interface layer. This heating stage can be arbitrary or can result from the subsequent deposition of a high temperature protection layer (>600° C.).

Moreover, as the oxidation-protected composite material according to the invention is used at a temperature above 600° C., the thickness of the interface layer increases to a limit value of approximately 1 micrometer.

Bearing in mind this consumption of the AlN layer, PECVD or CVD deposition methods are preferred, because they make it possible to deposit a layer of desired thickness. In particular, these methods make it possible to deposit a 10 to 100 micrometer thick AlN layer. The precise thickness of the AlN layer is a function of its use.

The chemical formation of an aluminum carbide interface layer, from a purely thermodynamic standpoint, does not occur between AlN and SiC up to 2000° C. Thus, the adhesion of the AlN to the C/C composite body differs from that of AlN to the structure described in FR-A-2 635 773.

The outer oxide layer has the function of preventing at high temperature and in particular under reduced pressure (1800° C. under 2.8 kPa or 2000° C. under 20 kPa), the penetration of oxygen from the environment (generally air) into the composite material. Therefore said layer must have a low gas permeability and good refractory characteristics. In particular, said layer must be crystalline and non-porous.

Preference is given to the use of alumina as a result of its lower oxygen diffusion coefficient. Thus, the diffusion coefficient of oxygen in alumina at 1200° C. is $3.10^{-16}$ cm$^2$/s, i.e. 100 times lower than that of silica, which is $3.10^{-14}$ cm$^2$/s. Its expansion coefficient is 8 to $9 \times 10^{-6}$/°C. The deposited alumina is alpha-alumina.

The refractory oxide layer deposition methods are in particular PECVD or CVD. The PECVD deposition temperature is between 200° and 800° C., whereas in the case of CVD method they are between 800° and 1400° C.

The precursor gases for PECVD alumina deposition are aluminum chloride, oxygen and hydrogen. In the CVD method, the deposition of an alumina layer takes place by gas phase hydrolysis of aluminum chloride.

The hydrolysis water is formed in situ in the reactor by the reaction of carbon dioxide gas on hydrogen. The following reactions are involved:

$$3 CO_2 + 3 H_2 \rightarrow 3 CO + 3 H_2O$$

$$2 AlCl_3 + 3 H_2O \rightarrow Al_2O_3 + 6 HCl$$

The reaction is essentially governed by the production of the water responsible for the hydrolysis of the aluminum chloride. Deposition takes place with a ratio of the partial hydrogen and carbon dioxide gas pressures close to 1.

The partial pressure of the aluminum chloride is relatively low and in particular below 0.5 kPa, so as to assist during deposition the diffusion of reactive species with respect to the formation kinetics of the alumina on the surface. In addition, the temperature of the carbon-containing material must not be too high, preferably below 1100° C.

In this way the deposition speed is solely controlled by the chemical reaction rate on the surface of the material.

These conditions make it possible to obtain a very uniform alumina covering adhering well to the AlN layer, essentially provided with its native oxide, as a result of its capacity of adapting perfectly to all the surface irregularities of the underlying material. The values of the parameters best fulfilling these conditions are total pressure 4 kPa, aluminum chloride pressure 0.1 kPa and carbon-containing material temperature 1000° C.

The thickness of the oxide layer obtained by PECVD or CVD is between 3 and 100 micrometers, as a function of the use conditions intended for the carbon-containing material.

During the cooling of the thus protected composite material, the cracks existing in the underlying AlN covering re-form. They are then resealed during the use of the composite material as soon as the temperature reaches the alumina deposition temperature of in this case 1000° C.

Moreover, during cooling, cracks appear in the oxide layer. The laws governing cracks in the oxide are the same as those referred to hereinbefore for AlN. Certain of the cracks of the outer oxide layer coincide with the cracks of the AlN, but they are generally located in uncracked AlN areas. These cracking processes are dependent on the relative deposition temperatures of each layer.

The cracks in the refractory oxide layer reseal during the use of the material as soon as the use temperature exceeds the oxide deposition temperature (particularly 1000° C.).

Although preference is given to CVD or PECVD methods for the deposition of the oxide layer, it is possible to use other deposition methods, such as in particular plasma spraying or physical vapour phase deposition (PVD).

These methods make it possible to form oxide layers at low temperature, in the same way as PECVD (20° to 600° C.), which can be chosen in order that the covering is not or is only slightly cracked when cold and is able to withstand without scaling off the compressive stresses occurring during its use at high temperature.

Plasma spraying gives relatively thick coverings ($\geq 100$ micrometers), but unfortunately they are not very tightly sealed, whilst PVD methods give relatively thin coverings of 1 to 10 micrometers.

In order to improve the adhesion of the alumina layer to the AlN layer, it is possible from an interface $AlN_xO_y$ layer with $0<x<1$ and $0<y<1.5$. This layer can be formed by CVD or PECVD under the same operating conditions as for AlN by adding to the mixture reactive gases such as oxygen or $CO_2$.

The process according to the invention is applicable to all types of composite material constituted by a fibrous substrate (carbon, graphite, ceramic, SiC, BN, $Al_2O_3$, etc.) embedded in a carbon-based matrix (graphitic, pyrolytic or vitreous carbon).

However, it is more particularly applicable to the production of a composite material incorporating a substrate of carbon fibers or of refractory material embedded in a carbon-based matrix. In addition, said matrix can be optionally doped by silicon carbide, boron nitride or carbide, i.e. contains less than 20% and in particular 2 to 10% by weight SiC, $B_4C$ or BN.

The production of a SiC-containing matrix is described in FR-A-2 611 198. It more particularly consists of impregnating the fibrous substrate in vacuo by a phenolic resin of the resol type on which 10% of the silicone functions (SiO) have been chemically grafted, followed by hot polymerization and high temperature pyrolysis (approximately 800° C.) of the resin.

In the absence of SiC, the carbon matrix is obtained in known manner by the pyrolysis of a thermosetting resin with a high carbon content, such as phenolic resins, by cracking hydrocarbons such as methane, propane, ethane or butane or by the pyrolysis of a coal tar at about 800° C.

Advantageously, each fiber of the substrate is covered with a thin silicon carbide layer with a thickness of 100 to 200 nm, in order to preserve the deformability of the substrate for its shaping during the production of a particular part, prior to forming the matrix by densification.

This SiC layer on the fibers is deposited by CVD using a gaseous mixture containing one or more organosilanes, which may or may not be substituted by a halogen optionally associated with one or more gaseous hydrocarbons and/or hydrogen.

The organosilanes which can be used are in particular chlorosilanes of form $(CH_3)_nSiCl_{(4-n)}$ with $0<n<4$. Reference can e.g. be made to trichloromethyl silane, tetramethyl silane and dichlorodimethyl silane. The hydrocarbons are in particular methane, ethane, propane and butane. In particular, use is made of a mixture of trichloromethyl silane and hydrogen with a ratio $(H_2)/(CH_3SiCl_3)=4$ to 12.

The use of silicon carbide on the surface of the substrate fibers and in the matrix makes it possible to ensure an anti-oxidation protection which greatly slows down the core oxidation of the composite carbon-carbon material in the case of an accidental destruction of the AlN layer.

According to the invention, the surface of each fiber can be provided with a pyrolytic carbon layer in contact with the SiC film coating these fibers. This pyrolytic carbon layer can be deposited prior to the SiC film of the fibers or afterwards. This pyrolytic carbon layer constitutes an interface which preserves, or even improves, the mechanical properties of the composite material. This pyrolytic carbon layer is deposited by high temperature CVD using one of the aforementioned hydrocarbons.

The invention also relates to a material obtained by the process described hereinbefore.

In particular, the invention relates to a material incorporating a composite body protected by an outer covering against environmental oxidation, said body incorporating a substrate of mineral fibers embedded in a carbon-based matrix, characterized in that the outer covering has an interface aluminum carbide layer in direct contact with the composite body, an aluminum nitride layer in direct contact with the interface layer and a tight refractory oxide outer layer covering the aluminum nitride layer.

BRIEF DESCRIPTION OF THE DRAWING

Other features and advantages of the invention can be gathered from the following description of non-limitative embodiments with reference to the attached FIGS. 1, 2, 3 and 4 diagramatically showing in cross-section different embodiments of the carbon-containing material protected against oxidation in accordance with the present invention.

DESCRIPTION OF THE PREFERRED EMBODIMENTS

Figure 1:
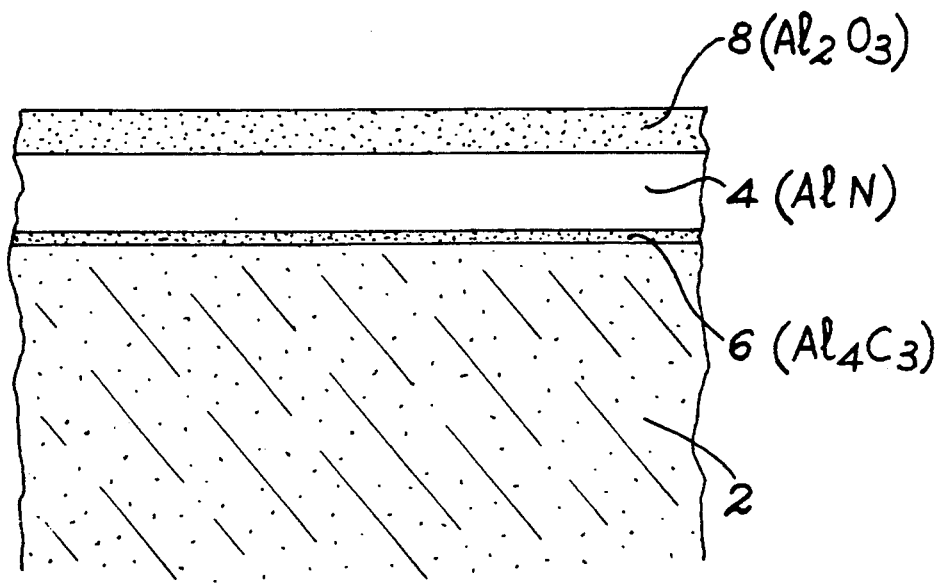

The material shown in FIG. 1 has a pyrolytic carbon body 2 obtained in per se known manner by pyrolysis in an appropriately shaped mould of a thermosetting resin having a high carbon content. Directly on the surface of the material is deposited by PECVD at above 600° C. of an aluminum nitride layer 4. This deposition takes place in a vacuum of 50 Pa. The deposition speed is a few micrometres per hour. The AlN layer 4 is 10 to 100 micrometers thick. It is tight and crystallized in hexagonal form. The relative quantities of each gas are defined by the following ratios:

$(N_2)/(AlCl_3)=0.8$ and $(N_2)/(NH_3)=0.7$.

This AlN deposition takes place at a temperature above 600° C., the AlN reacting with the carbon of the support 2 in order to form an aluminum carbide ($Al_4C_3$) layer 6.

According to the invention, this is followed by the deposition on the AlN layer 4 of a tight alpha alumina layer 8 with a thickness of 3 to 100 micrometres at 500° C. and using PECVD. The pressure in the deposition enclosure is relatively low and in particular below 50 Pa. This alumina deposition is obtained with a gaseous mixture defined by the ratios:

$$(AlCl_3)/(H_2)=0.5 \text{ and } (O_2)/(H_2)=1.$$

The thus obtained material is free from cracks, both with regards to the AlN layer and the alumina layer and can be used up to approximately 1300° C. in an atmosphere containing or not containing oxygen of 10 to $10^5$ Pa. The alumina covering scales off at above 1300° C.

Figure 2:
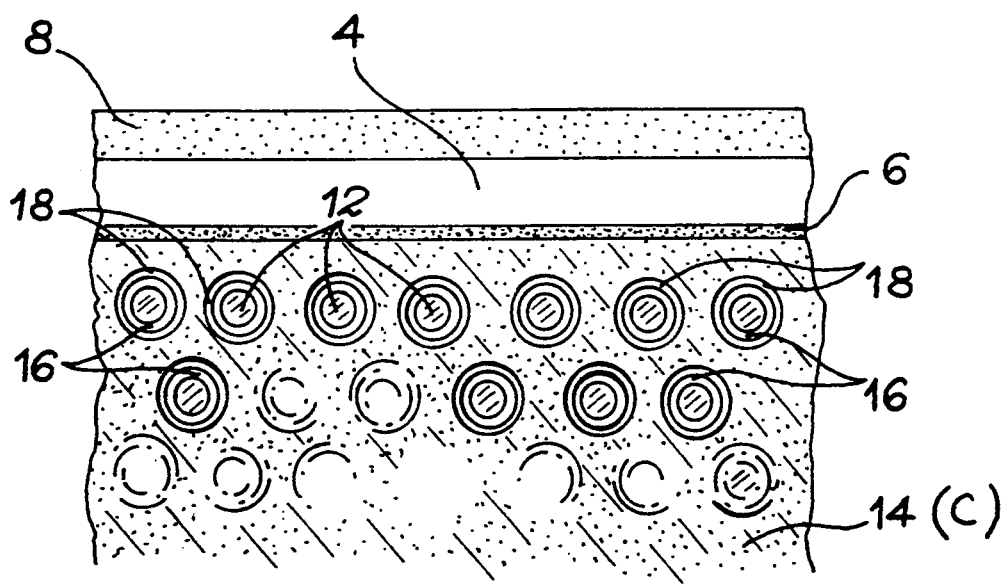

FIG. 2 shows the composite carbon-carbon material with graphite or carbon reinforcing fibers 12 embedded in a graphitic carbon matrix 14. These fibers 12 are woven or wound in two or three directions and have an approximate thickness of 8 micrometers. They can be short or long with a high resistance or a high modulus.

Each fiber 12 is coated by an extremely thin, 100 to 150 nm thick, pyrolytic carbon, anisotropic film 16. The latter is obtained by CVD at 1100° C. in furnace, where methane circulates under a pressure of 1.5 kPa.

Moreover, an approximately 100 to 200 nm thick silicon carbide layer 18 protects each fiber 12 from a possible core oxidation, by slowing down the diffusion of the oxygen. This SiC layer is formed by CVD at 900° C. using a mixture of trichloromethyl silane and hydrogen in a ratio $(H_2)/(CH_3SiCl_3)=8$ at a pressure of 10 Pa.

According to the invention, the outer surface of the matrix 14 is covered by a tight AlN layer 4 deposited by PECVD at 600° C. and then a tight alumina layer 8 deposited by PECVD at 500° C.

The AlN and alumina deposition conditions are identical to those described relative to FIG. 1. However, as the AlN deposition temperature is at the most equal to 600° C., a managed heating to a temperature above 1000° C. is carried out in order to form the $Al_4C_3$ attachment layer 6.

This material has no cracks and can be used up to 1000° C. in an oxygen atmosphere.

Figure 3:
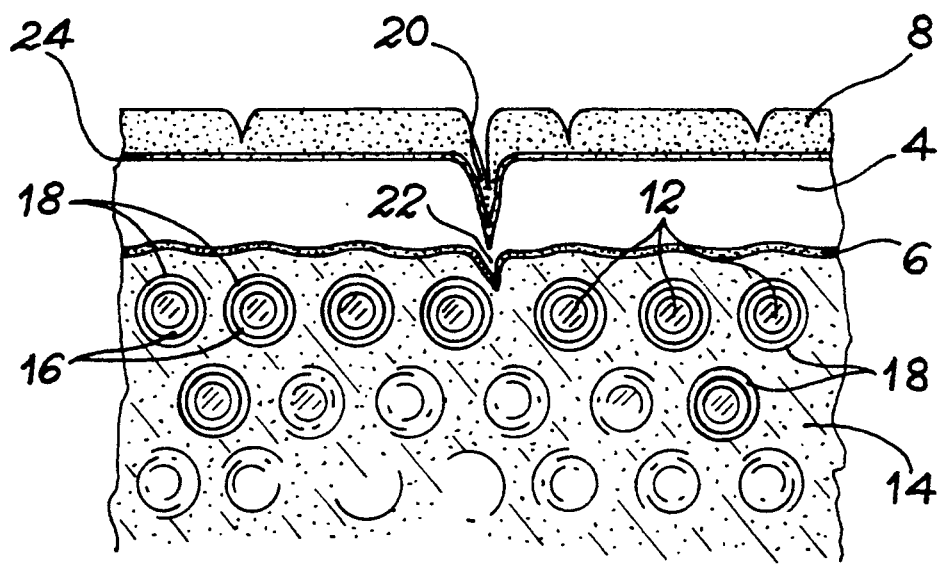

FIG. 3 shows another material according to the invention. In this material the aluminum nitride layer is deposited by CVD at between 600° and 1000° C. and in particular at 950° C. in an isothermal furnace, where circulation takes place under a reduced pressure of 500 to 1000 Pa of ammonia, hydrogen and aluminium chloride, accompanied by the scavenging of a neutral gas such as helium or argon. The proportions of the gases are in particular $(AlCl_3)/(NH_3)=10^{-1}$ and $(NH_3)/(H_2)=0.2$.

CVD leads to the formation of cracks 20 in the AlN layer 4, as well as cracks 22 in the underlying aluminum carbide layer 6 and these constitute sources for the penetration of oxygen at below the production temperature. This leads to the natural formation of a slightly porous alumina layer 24 on the surface of the AlN layer and in the cracks 20 thereof, which slows down oxygen penetration.

The outermost layer of the material is a tight alpha alumina layer 8 deposited by CVD at 600° to 1000° C. and in particular at 1000° C. This alumina deposition takes place under a reduced pressure of 5 kPa with a mixture of gases containing by volume 1% $AlCl_3$, 49.5% $H_2O$ and 49.5% $CO_2$.

This example corresponds to a general case with a high use temperature of approximately 2000° C. for an air pressure of approximately 1 to 100 kPa.

The material example shown in FIG. 4 differs from the previous embodiments by the deposition of an AlN layer 4 by PECVD at 400° C., under the same conditions as described with reference to FIG. 1, followed by a tight alumina deposit 8 using CVD at 950° C. It also differs through the absence of a pyrolytic carbon layer and a SiC carbide layer on the fibers 12.

The alumina layer deposition temperature, which exceeds 600° C., leads to the formation of the aluminum carbide interface layer 6.

The deposition of alumina by CVD leads to the formation of cracks 26 on its surface, which can bring about a slight penetration of oxygen into the alumina layer and thus create on its surface a natural alumina layer 24.

Figure 4:
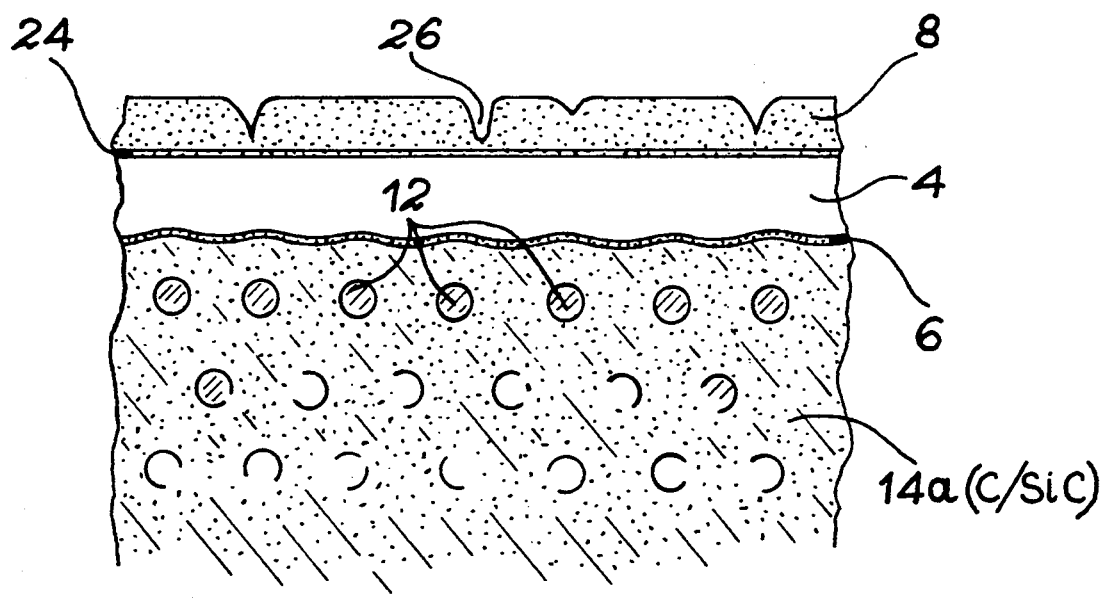

The example shown in FIG. 4 corresponds to a use temperature up to 1300° C. for a carbon matrix. With a SiC-containing carbon matrix symbolized by the reference 14a in FIG. 4, the use temperature extends to 1300° C.

I claim:

1. Process for producing a composite material protected against oxidation, said material comprising a composite body having a substrate of inorganic fibers embedded in a carbon-based matrix, said process consisting of forming said substrate;
    embedding said substrate in the carbon-based matrix for forming said composite body;
    directly depositing a crystalline aluminum nitride layer on said body with process heating to a first elevated temperature, said first elevated temperature selected to provide chemical reaction of aluminum of said nitride layer with carbon of said body to form an aluminum carbide layer between said aluminum nitride layer and said body;
    depositing on said aluminum nitride layer an outer layer of alpha alumina which is substantially impermeable to oxygen by chemical vapor deposition at a second elevated temperature of at least 950° C., said deposition step excluding the use of plasma assisted chemical vapor deposition.
    said first and second elevated temperatures being selected to provide oxidation protection and thermal stability at temperatures up to 2000° C.

2. A process according to claim 1, wherein said first elevated temperature is at least 600° C.

3. Process according to claim 1, wherein the deposit of the nitride layer is plasma assisted or plasma unassisted vapour phase chemical deposition (CVD).

4. Process according to claim 1, wherein the deposition of the aluminum nitride layer takes place at a temperature ensuring the formation of said aluminum carbide interface layer.

5. Process according to claim 1 wherein the first elevated temperature is between 600° C. and 1400° C.

6. Process according to claim 1 wherein each inorganic fiber is covered with a pyrolytic carbon film.

7. Process according to claim 1 wherein each inorganic fiber is covered with a silicon carbide film.

8. Process according to claim 1, wherein the carbon-based matrix is doped by silicon carbide.

9. Process according to claim 1, wherein an interface $AlN_xO_y$ layer is formed with $0<x<1$ and $0<y<1.5$ between the AlN layer and the $Al_2O_3$ layer.

* * * * *